United States Patent
Yamanaka et al.

(10) Patent No.: US 12,304,443 B2
(45) Date of Patent: May 20, 2025

(54) DRIVING ASSISTANCE DEVICE

(71) Applicant: HONDA MOTOR CO., LTD., Tokyo (JP)

(72) Inventors: Fumikage Yamanaka, Tokyo (JP); Naoki Tsuchiya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/587,958

(22) Filed: Feb. 27, 2024

(65) Prior Publication Data

US 2024/0359667 A1    Oct. 31, 2024

(30) Foreign Application Priority Data

Apr. 26, 2023  (CN) .......................... 202310461220.3

(51) Int. Cl.
  *B60K 26/02*  (2006.01)
  *B60T 7/12*  (2006.01)

(52) U.S. Cl.
  CPC ................ *B60T 7/12* (2013.01); *B60K 26/02* (2013.01)

(58) Field of Classification Search
  CPC .............. B60T 7/10; B60T 7/12; B60K 26/02
  See application file for complete search history.

(56) References Cited

U.S. PATENT DOCUMENTS

| | | | | |
|---|---|---|---|---|
| 2,393,621 | A | * | 1/1946 | Adams ...................... H02P 9/04  322/17 |
| 4,491,209 | A | * | 1/1985 | Bening .................. B60W 10/18  74/483 R |
| 2006/0071541 | A1 | * | 4/2006 | Berg ........................ F16H 61/66  303/89 |
| 2015/0006014 | A1 | * | 1/2015 | Wimmer .............. B60K 26/021  701/23 |
| 2017/0129465 | A1 | * | 5/2017 | Ozawa .................... B60T 1/062 |

FOREIGN PATENT DOCUMENTS

JP          2007045384 A       2/2007

* cited by examiner

*Primary Examiner* — Edwin A Young
(74) *Attorney, Agent, or Firm* — CKC & Partners Co., LLC (57) ABSTRACT

To provide a driving assistance device with which a brake held state can be automatically or easily set. A driving assistance device includes a controller configured to collect detection results of an operation state of an operation lever and a state of a vehicle, the controller determines whether to set a holder to be held or released based on the operation state of the operation lever and the state of the vehicle, and a switching instruction unit provides an instruction for switching the holder between a held state and a released state in accordance with a result of the determination by the controller.

10 Claims, 6 Drawing Sheets

DRIVING ASSISTANCE DEVICE

This application is based on and claims the benefit of priority from Chinese Patent application No. CN202310461220.3 filed on Apr. 26, 2023, the content of which is incorporated herein by reference.

BACKGROUND OF THE INVENTION

Field of the Invention

The present disclosure relates to a driving assistance device.

Related Art

Conventionally, a device including an operation lever or the like with which an acceleration pedal and a brake pedal can be manually operated has been available as a driving assistance device that is suitable for driving by a physically impaired person. Patent Document 1 discloses the structure of a portable driving assistance device including a ratchet mechanism that locks the brake position in a brake actuated state and is released by using a release lever so that a parking brake operation at a hill or temporary stop is unnecessary. In another conventionally known configuration, the operation lever or the like is provided with a brake holding switch for holding the brake position in a brake actuated state.

Patent Document 1: Japanese Unexamined Patent Application, Publication No. 2007-45384

SUMMARY OF THE INVENTION

However, it is potentially difficult to operate the release lever for the operation lever, the brake holding switch, and the like depending on the degree of disability of a user, and thus improvement of operability of holding the brake has been required.

The present disclosure is intended to provide a driving assistance device with which a brake held state can be automatically or easily set.

The present disclosure solves the problem by the following means for solution. Reference signs corresponding to an embodiment of the present disclosure are attached in description to facilitate understanding, but the present disclosure is not limited thereto.

A first disclosure is a driving assistance device (1) including an operation lever (101) for performing operations of drive force and braking force of a vehicle, in the driving assistance device (1), the operation lever (101) is movable, by an operation, to an acceleration region in which the vehicle generates drive force and a brake region in which the vehicle generates braking force, the driving assistance device includes a holder (108, 110, 111, 112) configured to maintain braking force in a held state, and a controller (10) configured to set the holder (108, 110, 111, 112) to be held or released in accordance with an operation state of the operation lever (101) and a state of the vehicle, the controller (10) includes a first determiner (11) configured to determine whether a vehicle speed is equal to or lower than a predetermined vehicle speed threshold and a second determiner (12) configured to determine the operation state of the operation lever (101), the controller (10) switches from a released state to a held state in a case where a result of the determination by the first determiner (11) is higher than the vehicle speed threshold, and the controller (10) switches from the released state to the held state in accordance with a result of the determination by the second determiner (12) in a case where the result of the determination by the first determiner (11) is equal to or lower than the vehicle speed threshold.

A second disclosure is the driving assistance device (1) according to the first disclosure and in the driving assistance device (1), the held state is released when the operation lever (101) is operated in a direction in which the vehicle generates braking force in a state in which the holder (108, 110, 111, 112) is in the held state and the controller (10) provides an instruction for setting the holder (108, 110, 111, 112) to the released state.

A third disclosure is the driving assistance device (1) according to the first or second disclosure, and in the driving assistance device (1), the controller (10) provides an instruction for switching from the released state to the held state in a case where the second determiner (12) determines that operation speed of the operation lever (101) is equal to or higher than a predetermined operation speed threshold and the operation lever is in a holding determination region in which it is determined that the holder is to be set to the held state.

A fourth disclosure is the driving assistance device (1) according to the first or second disclosure, and in the driving assistance device (1), the controller (10) uses, as one of requirements for switching from the released state to the held state, elapse of a certain time period since an instruction for setting the held state is provided.

A fifth disclosure is the driving assistance device (1) according to the first or second disclosure, and in the driving assistance device (1), the operation lever (101) is movable to a brake holding region in addition to the acceleration region and the brake region, and the controller (10) switches from the released state to the held state when the operation lever (101) is operated to the brake holding region.

A sixth disclosure is the driving assistance device (1) according to the fifth disclosure, and in the driving assistance device (1), the brake holding region is provided at a position where the operation lever (101) is operated beyond a region in which the braking force is generated.

A seventh disclosure is the driving assistance device (1) according to the fifth disclosure, and in the driving assistance device (1), the operation lever (101) is additionally movable to a brake holding release-region, and the controller (10) maintains an instruction for switching from the held state to the released state until a brake is completely released once the operation lever (101) is operated to the brake holding release-region.

According to the present disclosure, it is possible to provide a driving assistance device capable of automatically or easily switching between a brake held state and a holding released state.

DETAILED DESCRIPTION OF THE INVENTION

Embodiments of the present disclosure will be described below with reference to the accompanying drawings and the like.

First Embodiment

Figure 1:
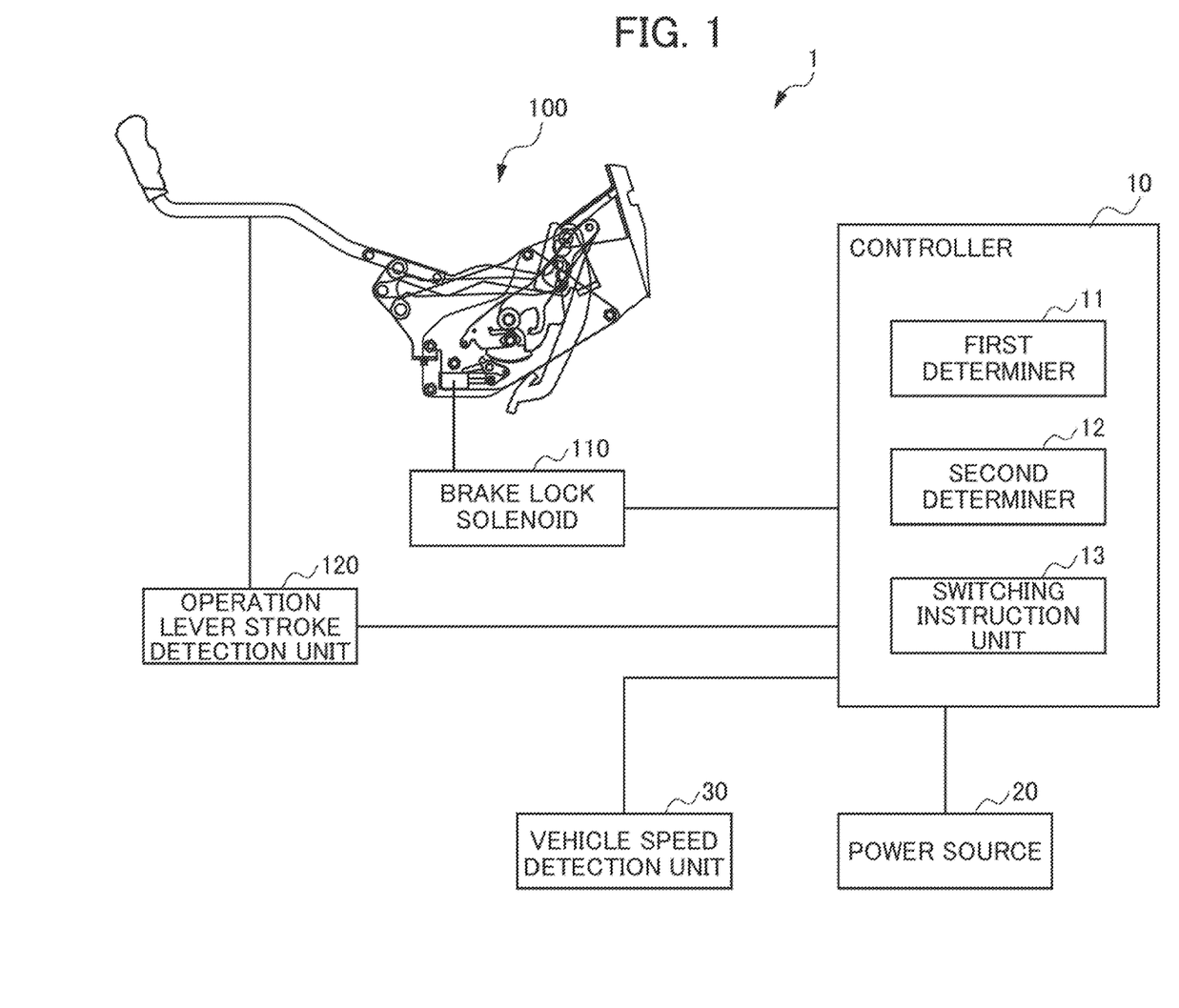
FIG. 1 is a diagram for description of an overview of a driving assistance device 1 of a first embodiment.
Figure 2:
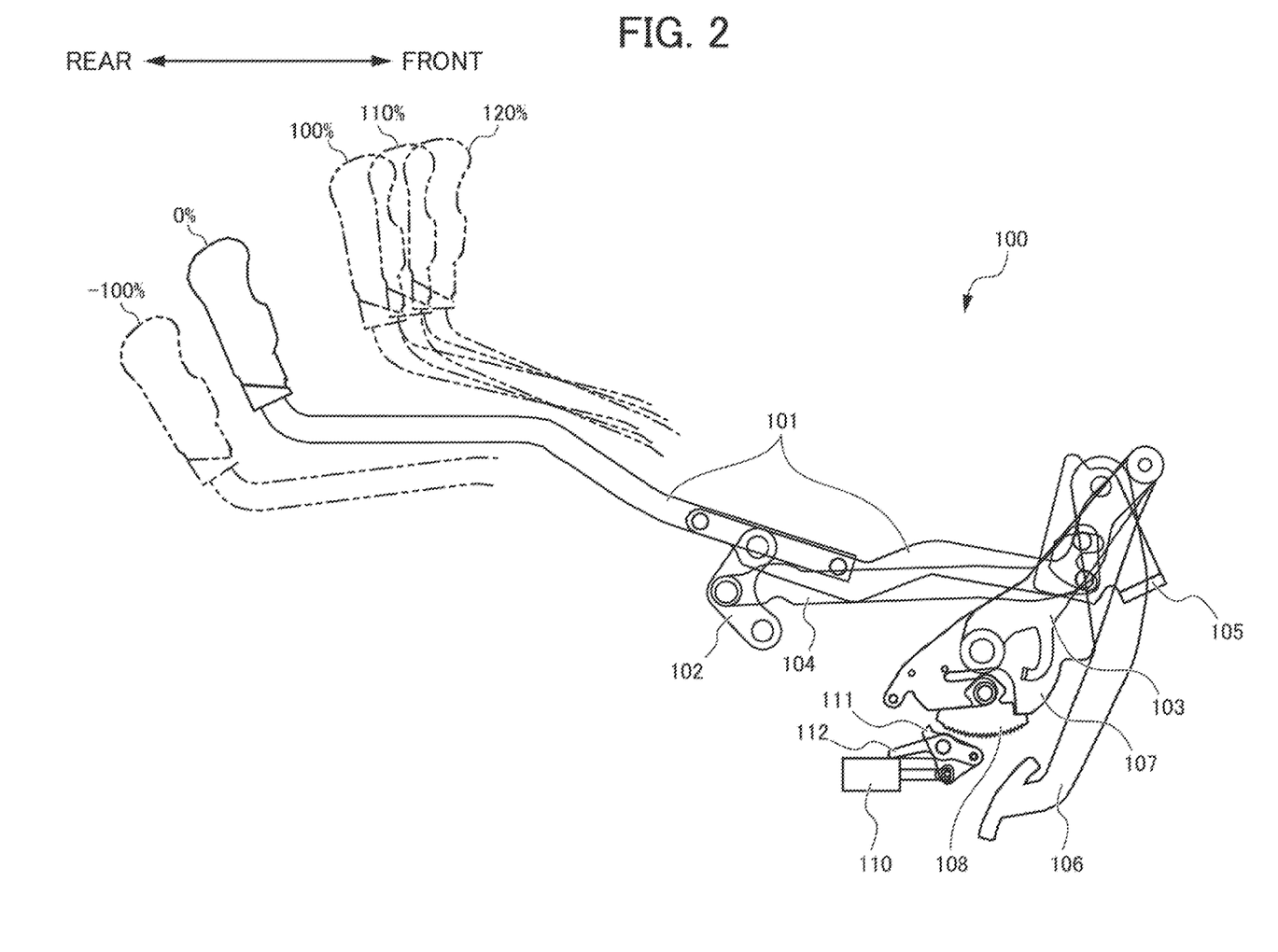
FIG. 2 is a side view illustrating main parts of a load transfer device 100 in a neutral state.
Figure 3:
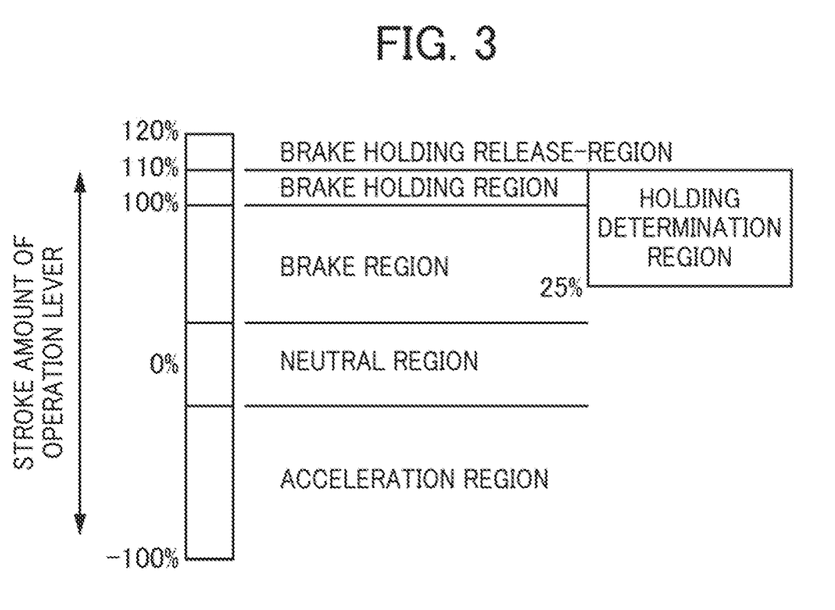
FIG. 3 is a diagram illustrating the relation between the stroke amount of an operation lever 101 and each operation region in the first embodiment.

FIG. 1 is a diagram for description of an overview of a driving assistance device 1 of a first embodiment. FIG. 2 is a side view illustrating main parts of a load transfer device 100 in a neutral state. Only main members of the load transfer device 100 are illustrated in FIGS. 1 and 2, and only the shapes of main parts of movable members of the load transfer device 100 are transparently illustrated in an overlapping manner in FIG. 2. FIG. 3 is a diagram illustrating the relation between the stroke amount of an operation lever 101 and each operation region in the first embodiment. Each drawing is a schematically illustrated diagram and, the size and shape of each component are exaggerated and omitted as appropriate to facilitate understanding.

The driving assistance device 1 of the present embodiment is a device that is attached to a non-illustrated vehicle and supports driving by a physically impaired person and includes a controller 10 and the load transfer device 100. In addition, the controller 10 is supplied with electric power from a power source 20 and receives the speed of the vehicle from a vehicle speed detection unit 30 provided at the vehicle.

The controller 10 is a control instrument (arithmetic device) that controls the operation of the driving assistance device 1, and may be, for example, an electronic control unit (ECU) that collectively controls the operation of the vehicle. The controller 10 is connected to the power source 20 and supplied with electric power necessary for the operation of the controller 10. The controller 10 collects detection results of the operation state of the operation lever 101 and the state of the vehicle. Examples of the state of the vehicle include vehicle speed, the state of acceleration and deceleration, tilt in the front-rear direction, weight of loading persons, weight distribution of loading persons in the front-rear direction, barycenter height of loading persons, friction coefficients of tire ground points, temperature, and humidity. As a particularly highly related configuration in the present embodiment, the vehicle speed detection unit 30 is connected to the controller 10 and the controller 10 receives the speed of the vehicle, which is detected by the vehicle speed detection unit 30. The controller 10 includes a first determiner 11, a second determiner 12, and a switching instruction unit 13 configured to provide, to a brake lock solenoid 110, an instruction for switching a holder between a held state and a released state in accordance with a result of determination by the controller 10, which will be described later in detail.

The load transfer device 100 is a device that is additionally attached to a vehicle for a physically unimpaired person and allows a physically impaired person to perform brake and acceleration operations of the vehicle through operations with a hand. With the load transfer device 100 of the present embodiment, brake is operated by performing a brake operation that the operation lever 101 is operated substantially in the front direction, and acceleration is operated by performing an acceleration operation that the operation lever 101 is operated substantially in the rear direction. In the following description, the neutral state is a state in which the operation lever 101 is located at a position (position of 0% in FIG. 2) where no brake operation nor acceleration operation is performed. The front direction is a front side illustrated with an arrow in FIG. 2 and corresponds to the front side of the vehicle, and the rear direction is a rear side illustrated with an arrow in FIG. 2 and corresponds to the rear side of the vehicle.

The load transfer device 100 includes the operation lever 101, a first member 102, a second member 103, a third member 104, a transfer member 105, a brake pedal 106, a fourth member 107, a lock teeth member 108, the brake lock solenoid 110, and lock claw members 111 and 112.

The operation lever 101 includes a link mechanism constituted by combination of the first member 102, the second member 103, and the third member 104 and can be moved (stroked) substantially in the front-rear direction from the position of −100% to the position of 120% in the drawing by an operation with a driver's hand. The position where the stroke of the operation lever 101 is 0% is a neutral position, the region in which the stroke of the operation lever 101 is less than 0% to −100% is an acceleration region, the position where the stroke of the operation lever 101 is −100% is the position of maximum accelerator opening, the region in which the stroke of the operation lever 101 is greater than 0% to 100% is a brake region, and the position where the stroke of the operation lever 101 is 100% is the position of maximum brake force. In addition, the position of 100% to 110% is a brake holding region and the position of 110% to 120% is a brake holding release-region. In the brake region, a range from the stroke position of the operation lever 101 at a predetermined value or larger (in the present embodiment, the position of 25% or higher) to the brake holding region is a holding determination region in which the controller 10 determines that the holder is to be set to the held state. The operation lever 101 may include, at a boundary part between the brake region and the brake holding region and a boundary part between the brake holding region and the brake holding release-region, a notification means that allows the driver to notice existence of the boundary parts during operation stroke. For example, the notification means may perform notification by slight resistance force (click feeling), voice, display, or the like when the operation stroke moves across each boundary part.

In the neutral state in which the operation lever 101 is at the neutral position (the position of 0% in FIG. 2, a neutral region in FIG. 3), no acceleration operation nor brake operation is performed. In a state in which the driver puts a hand off the operation lever 101, except for a brake held state to be described later, the operation lever 101 is moved to the neutral position by biasing force of a non-illustrated biasing member and maintained at the position.

When the operation lever 101 is operated for acceleration, in other words, is operated substantially in the rear direction (the −100% side relative to the position of 0% in FIG. 2, the acceleration region in FIG. 3), the second member 103 rotates, the actuation amount of a non-illustrated acceleration detection member is detected by a non-illustrated acceleration sensor unit, and the detected amount is transferred as an acceleration operation amount to the controller 10. Accordingly, the controller 10 provides an instruction for opening acceleration. The brake pedal 106 does not operate while the operation lever 101 is operated for acceleration. In the present embodiment, the vehicle is provided with a non-illustrated acceleration pedal for a physically unimpaired person, but the load transfer device 100 does not allow the acceleration pedal to operate while the operation lever 101 is operated for acceleration.

When the operation lever 101 is operated for braking, in other words, is operated substantially in the front direction (the range of 0% to 100% in FIG. 2, the brake region in FIG. 3), the third member 104 moves to the front side and pushes the transfer member 105, and accordingly, the brake pedal 106 is pushed to the front side and brake is operated. In this state, when the operation lever 101 is operated substantially in the front direction, the lock teeth member 108 rotates together with the fourth member 107 in accordance with the brake position. The lock teeth member 108 is continuously provided with lock teeth, and the position of the lock teeth member 108 can be temporarily fixed (locked) by the lock claw members 111 and 112. The brake held (locked) state is achieved when the position of the lock teeth member 108 is locked, and a state in which brake is actuated at maximum brake force is maintained. The operation lever 101 is regulated not to move toward the rear side (acceleration region) but allowed to move only toward the front side (brake region side). The lock claw members 111 and 112 can be moved between a locking position and a non-locking position by the brake lock solenoid 110. The brake lock solenoid 110 is an electric actuator that drives a movable iron core (plunger) in accordance with an instruction from the switching instruction unit 13 of the controller 10 and moves the lock claw members 111 and 112 between the locking position and the non-locking position. The two lock claw members 111 and 112 are lock claw members in the example described in the present embodiment, but may be integrated as one lock claw member. The lock teeth member 108, the brake lock solenoid 110, and the lock claw members 111 and 112 constitute a holder configured to hold the position of the operation lever 101 and maintain braking force in the held state. Hereinafter, the lock teeth member 108, the brake lock solenoid 110, and the lock claw members 111 and 112 are also collectively referred to as the holder. While the operation lever 101 is operated for braking, the non-illustrated acceleration detection member does not move and no acceleration operation is performed.

The held state by the holder is not released by only operating the brake lock solenoid 110 in a direction to release the held state in accordance with an instruction from the controller 10. Since the lock teeth member 108 and the lock claw member 111 contact each other by strong force when the holder is in the held state, engagement between the lock teeth member 108 and the lock claw member 111 is not released even when the brake lock solenoid 110 is operated in the release direction. Even in this state, as the operation lever 101 is moved to the front side (brake region side), the lock teeth member 108 moves in a direction in which force of contact with the lock claw member 111 becomes weaker. Accordingly, in order to release engagement between the lock teeth member 108 and the lock claw member 111, it is needed to operate the brake lock solenoid 110 in the direction to release the held state as well as to move the operation lever 101 to the front side (brake region side). Since the operation lever 101 needs to be moved to the front side, it is possible to prevent release of the held state without the driver's intention.

Brake holding operation of the driving assistance device 1 of the present embodiment will be described below. As illustrated in FIG. 3, the operation lever 101 is movable, by an operation, to the acceleration region in which the vehicle generates drive force, the brake region in which the vehicle generates braking force, and the brake holding region. When the operation lever 101 is moved to the brake holding region through the brake region, the controller 10 actuates the holder to set the brake held state. With this configuration, it is unnecessary to operate a brake lock switch conventionally provided at an operation lever, which can improve convenience and prevent a false operation. Moreover, the operation lever can be operated by a driver who has a disability with which it is difficult to operate the brake lock switch. Furthermore, the brake holding region is provided at a position where the operation lever 101 is further operated to the front side beyond the brake region, which enables intuitive operation by the driver.

The controller 10 includes the first determiner 11 configured to determine whether the vehicle speed is equal to or lower than a predetermined vehicle speed threshold, and the second determiner 12 configured to determine the operation state of the operation lever 101. The operation state of the operation lever 101 includes not only the position of the operation lever 101 but also the operation speed of the operation lever 101. In the present embodiment, the controller 10 does not actuate the holder nor perform brake holding in a case where a result of the determination by the first determiner 11 is higher than the vehicle speed threshold, and the controller 10 determines whether to actuate the holder to hold brake based on a result of the second determiner 12 in a case where the result of the first determiner 11 is equal to or lower than the vehicle speed threshold. The vehicle speed threshold may be optionally set and is, for example, 5 km/h.

Figure 4:
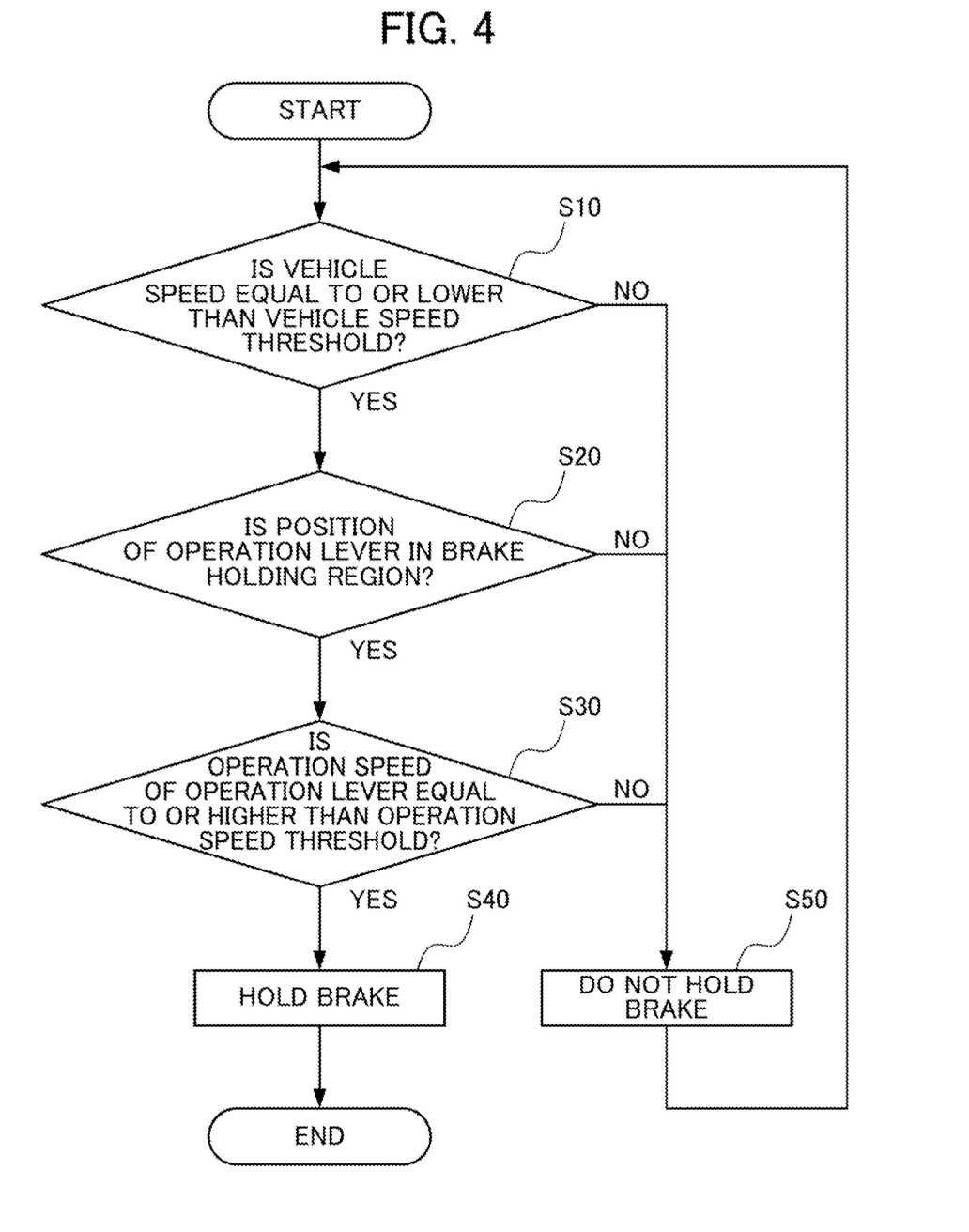
FIG. 4 is a flowchart illustrating the process of determination of whether to perform brake holding operation by a controller 10.

FIG. 4 is a flowchart illustrating the process of determination of whether to perform the brake holding operation, which is performed by the controller 10. At step (hereinafter referred to as "S") 10, the first determiner 11 determines whether the vehicle speed is equal to or lower than the vehicle speed threshold. The process proceeds to S20 in a case where the vehicle speed is equal to or lower than the vehicle speed threshold (YES), or the process proceeds to S50 in a case where the vehicle speed is higher than the vehicle speed threshold (NO).

At S20, the second determiner 12 determines whether the position of the operation lever 101 is in the holding determination region. The process proceeds to S30 in a case where the position of the operation lever 101 is in the holding determination region (YES), or the process proceeds to S50 in a case where the position of the operation lever 101 is not in the holding determination region (NO)). The holding determination region includes not only the brake holding region but also a partial region of the brake region. Accordingly, the process proceeds to S30 in a case where the driver operates the operation lever 101 to the brake holding region with clear intention as well as a case where the operation lever 101 is in the brake region.

At S30, the second determiner 12 determines whether the operation speed of the operation lever 101 is equal to or higher than an operation speed threshold. The process proceeds to S40 in a case where the operation speed of the operation lever 101 is equal to or higher than the operation speed threshold, or the process proceeds to S50 in a case where the operation speed of the operation lever 101 is lower than the operation speed threshold.

At S40, the controller 10 provides an operation instruction for brake locking to the brake lock solenoid 110 and performs the brake holding operation by the holder. When the brake holding operation is performed, as described above, brake is held at maximum brake force and the operation lever 101 is regulated not to move toward the rear side (acceleration region) but allowed to move only toward the front side (brake region side). After the brake holding operation is performed at S40, the operation of determining whether to perform brake holding is ended.

At S50, the controller 10 determines not to perform brake holding and returns to S10. In this manner, in the present embodiment, the vehicle speed is monitored, and it is determined that the driver needs brake holding and the brake held state is automatically set in a case where the vehicle speed is equal to or lower than the vehicle speed threshold (condition 1), in a case where the position of the operation lever 101 is in the brake holding region (condition 2), and in a case where the operation speed of the operation lever 101 is equal to or higher than the predetermined operation speed threshold (condition 3). Accordingly, the brake held state is automatically set only in a case where the three conditions are satisfied, and thus false actuation can be prevented.

In the present embodiment, all above-described conditions 1 to 3 are required to be satisfied for automatically setting the brake held state, but the present disclosure is not limited thereto, and for example, the brake held state may be automatically set when only conditions 1 and 2 are satisfied. In this case as well, the brake held state is not set in a case where the vehicle speed is higher than the vehicle speed threshold, and thus false actuation can be prevented.

Figure 5:
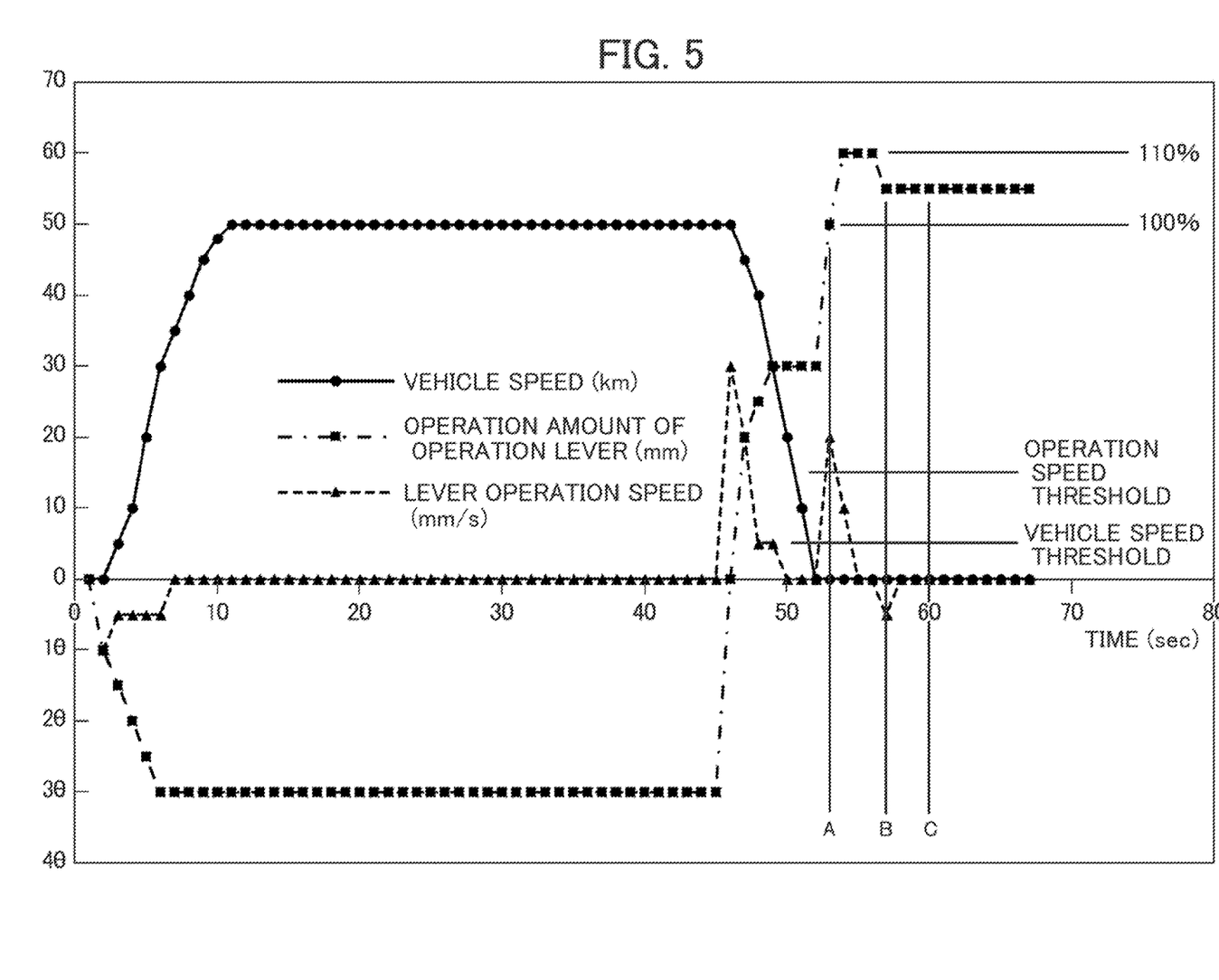
FIG. 5 is a diagram illustrating change in vehicle speed (km/h) in operation, operation position (mm) of the operation lever 101, and operation speed (mm/s) of the operation lever 101.

Release of the brake held state will be described below. FIG. 5 is a diagram illustrating change in the vehicle speed (km/h) in operation, the operation position (mm) of the operation lever 101, and the operation speed (mm/s) of the operation lever 101. In FIG. 5, the horizontal axis represents time (sec). Up to 45 sec, the vehicle travels at constant speed after acceleration since a stop state. In the example illustrated in FIG. 5, the driver starts operating the operation lever 101 toward the front side at 45 sec, and then, from 46 sec, the operation lever 101 is in the brake region and the vehicle speed gradually decreases. At 52 sec or later, the vehicle speed becomes lower than the vehicle speed threshold (condition 1) and the vehicle stops. Then, at point A (in this example, 53 sec) in FIG. 5, the position of the operation lever 101 enters the brake holding region beyond the position of 100% (condition 2) and the operation speed of the operation lever 101 exceeds the operation speed threshold. Accordingly, since requirement for brake holding is satisfied at point A, the controller 10 provides an instruction for performing brake holding to the brake lock solenoid 110, and the holder becomes the brake held state.

At point B (in this example, 57 sec) in FIG. 5, the driver removes their hand from the operation lever 101, and the position of the operation lever 101 slightly moves toward the neutral side but the operation lever 101 is still in the brake holding region. Point C (in this example, 60 sec) in FIG. 5 indicates a position where seven seconds have elapsed since point A (53 sec) of transition to the brake held state. The controller 10 uses, as one of requirements for releasing the held state of the holder, elapse of a certain time period (in the present embodiment, 7 sec) or longer since an instruction for setting the held state is provided to the holder. When a certain time period (in the present embodiment, 7 sec) or longer has elapsed since an instruction for setting the held state is provided to the holder, the switching instruction unit 13 of the controller 10 provides an instruction for releasing brake holding to the brake lock solenoid 110, and the holder becomes a release preparation state in which the released state can be set. Then, when the operation lever 101 is moved toward the front side in the release preparation state, engagement between the lock teeth member 108 and the lock claw member 111 is released and the held state of the holder is actually released. Accordingly, in the present embodiment, the brake held state can be released at point C or later. Thus, although the brake held state continues at point C or later, the brake held state of the holder is released when the driver operates the operation lever 101 toward the front side (brake region side). With this configuration, only when the driver has clear intention to release brake lock, the brake held state can be released by moving the operation lever 101 toward the front side (brake region side) after elapse of a certain time, and thus a false operation can be prevented.

In the driving assistance device 1 of the present embodiment, the brake held state can be released by any other method than the above-described method of releasing the brake held state. The operation lever 101 can be moved to the brake holding release-region when moved additionally toward the front side beyond the brake holding region. Once the operation lever 101 is operated to the brake holding release-region beyond the brake holding region while the holder is in the held state, the switching instruction unit 13 maintains an instruction for switching from the held state to the released state until the brake is completely released. In this manner, since the brake holding release-region is provided for the driving assistance device 1 of the present embodiment, even a driver who has a disability with which it is difficult to operate a conventional brake lock switch can switch between the brake held state and held state release. The "driver who has a disability with which it is difficult to operate a conventional brake lock switch" is, for example, a driver who can only move their fingers with a weak force and cannot push the brake lock switch but can perform operations of pushing and pulling the operation lever through forward and backward motion of the arm by pushing down the operation lever with their palm. With the driving assistance device 1 of the present embodiment, even such a driver can release brake lock by operation of pushing the operation lever 101 (pushing beyond the brake holding region). The brake holding release-region is provided in the configuration exemplarily described in the present embodiment, but no brake holding release-region may be provided.

Second Embodiment

Figure 6:
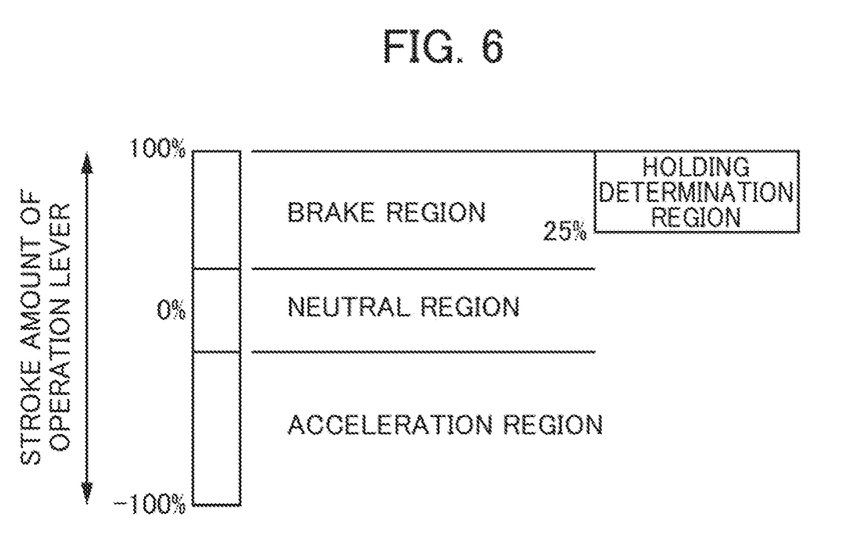
FIG. 6 is a diagram illustrating the relation between the stroke amount of the operation lever 101 and each operation region in a second embodiment.

FIG. 6 is a diagram illustrating the relation between the stroke amount of the operation lever 101 and each operation region in a second embodiment. The driving assistance device 1 of the second embodiment is the same as in the first embodiment except that a range in which the operation lever 101 can be operated is different, and accordingly, operation of switching between the held state and the released state of the holder is partially different. Thus, any part having the same function as in the first embodiment described above is denoted by the same reference sign, and duplicate description thereof is omitted as appropriate.

As illustrated in FIG. 6, the range in which the operation lever 101 can be operated in the second embodiment has no operable range beyond the brake region. Thus, the brake holding region and the brake holding release-region in the first embodiment are not provided. Accordingly, in the second embodiment, the holding determination region is provided only in the brake region. In the second embodiment, operation in a case where the holder is set to the held state is the same as in the first embodiment except that the holding determination region is narrow.

On the other hand, in the second embodiment, the brake holding region and the brake holding release-region in the first embodiment are not provided. Accordingly, the second embodiment is different from the first embodiment in that it is impossible to perform operation of releasing the held state of the holder by moving the operation lever 101 toward the front side beyond the brake holding region to the brake holding release-region, but except that, is the same as the first embodiment in operation of releasing the held state of the holder. Thus, the brake held state can be released at point C or later in FIG. 5 described above. Although the brake held state continues at point C or later, the brake held state of the holder is released when the driver operates the operation lever 101 toward the front side (brake region side). With this configuration, only when the driver has clear intention to release brake lock, the brake held state can be released by moving the operation lever 101 toward the front side (brake region side) after elapse of a certain time, and thus a false operation can be prevented. Moreover, the operation stroke of the operation lever 101 can be reduced as compared to the first embodiment, and it is possible to achieve a driving assistance device with which the brake held state can be automatically or easily set with a simpler configuration.

(Modifications)

Various kinds of modifications and changes are possible without limitation to the above-described embodiments and are included in the scope of the present disclosure.

(1) In the above-described example of the embodiment, the brake pedal 106 is physically pushed in the driving assistance device 1. However, the present disclosure is not limited thereto, and for example, the acceleration pedal may be physically pushed and the brake pedal 106 may not be physically pushed. In this case, a brake sensor part that detects the amount of a brake operation by the operation lever 101 is provided and the amount detected by the brake sensor part is transferred as a brake operation amount to the controller of the vehicle to perform brake operation. Moreover, an acceleration operation and a brake operation by the operation lever may be detected by sensors to perform acceleration and braking.

Each embodiment and modification may be applied in combination as appropriate, but detailed description thereof is omitted. The present disclosure is not limited by each above-described embodiment.

EXPLANATION OF REFERENCE NUMERALS 1 driving assistance device
10 controller
11 first determiner
12 second determiner
13 switching instruction unit
20 power source
30 vehicle speed detection unit
100 load transfer device
101 operation lever
102 first member
103 second member
104 third member
105 transfer member
106 brake pedal
107 fourth member
108 lock teeth member
110 brake lock solenoid
111 lock claw member
112 lock claw member

What is claimed is:

1. A driving assistance device including an operation lever for performing operations of drive force and braking force of a vehicle, wherein
the operation lever is movable, by an operation, to an acceleration region in which the vehicle generates the drive force and a brake region in which the vehicle generates the braking force,
the driving assistance device comprising:
a holder configured to maintain the braking force in a held state, and
a controller configured to set the holder to be held or released in accordance with an operation state of the operation lever and a state of the vehicle, wherein
the controller includes
a first determiner configured to determine whether a vehicle speed is equal to or lower than a predetermined vehicle speed threshold, and
a second determiner configured to determine the operation state of the operation lever,
the controller switches from a released state to the held state in a case where a result of the determination by the first determiner is higher than the vehicle speed threshold, and
the controller switches from the released state to the held state in accordance with a result of the second determiner in a case where the result of the determination by the first determiner is equal to or lower than the vehicle speed threshold.

2. The driving assistance device according to claim 1, wherein
the held state is released when the operation lever is operated in a direction in which the vehicle generates the braking force in a state in which the holder is in the held state and the controller provides an instruction for setting the holder to the released state.

3. The driving assistance device according to claim 2, wherein
the controller provides an instruction for switching from the released state to the held state in a case where the second determiner determines that operation speed of the operation lever is equal to or higher than a predetermined operation speed threshold and the operation lever is in a holding determination region in which it is determined that the holder is to be set to the held state.

4. The driving assistance device according to claim 2, wherein
the controller uses, as one of requirements for switching from the released state to the held state, elapse of a certain time period since an instruction for setting the held state is provided.

5. The driving assistance device according to claim 2, wherein
the operation lever is movable to a brake holding region in addition to the acceleration region and the brake region, and
the controller switches from the released state to the held state when the operation lever is operated to the brake holding region.

6. The driving assistance device according to claim 1, wherein
the controller provides an instruction for switching from the released state to the held state in a case where the second determiner determines that operation speed of the operation lever is equal to or higher than a predetermined operation speed threshold and the operation lever is in a holding determination region in which it is determined that the holder is to be set to the held state.

7. The driving assistance device according to claim 1, wherein
the controller uses, as one of requirements for switching from the released state to the held state, elapse of a certain time period since an instruction for setting the held state is provided.

8. The driving assistance device according to claim 1, wherein
the operation lever is movable to a brake holding region in addition to the acceleration region and the brake region, and
the controller switches from the released state to the held state when the operation lever is operated to the brake holding region.

9. The driving assistance device according to claim 8, wherein
the brake holding region is provided at a position where the operation lever is operated beyond a region in which the braking force is generated.

10. The driving assistance device according to claim 8, wherein
the operation lever is additionally movable to a brake holding release-region, and
the controller maintains an instruction for switching from the held state to the released state until a brake is completely released once the operation lever is operated to the brake holding release-region.

* * * * *